(12) United States Patent
Stanhope et al.

(10) Patent No.: US 12,543,626 B2
(45) Date of Patent: Feb. 10, 2026

(54) SYSTEM AND METHOD FOR CONTROLLING ROW CLEANER POSITIONING ON A SEED-PLANTING IMPLEMENT

(71) Applicant: CNH Industrial America LLC, New Holland, PA (US)

(72) Inventors: Trevor Stanhope, Oak Lawn, IL (US); Michael Christopher Conboy, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 966 days.

(21) Appl. No.: 17/725,833

(22) Filed: Apr. 21, 2022

(65) Prior Publication Data

US 2023/0337573 A1    Oct. 26, 2023

(51) Int. Cl.
  A01C 7/00    (2006.01)
  A01C 5/06    (2006.01)
  A01C 7/20    (2006.01)

(52) U.S. Cl.
  CPC ............. *A01C 7/006* (2013.01); *A01C 5/064* (2013.01); *A01C 7/203* (2013.01)

(58) Field of Classification Search
  CPC ......... A01C 7/006; A01C 7/203; A01C 5/062; A01C 5/064
  See application file for complete search history.

(56) References Cited

U.S. PATENT DOCUMENTS

| | | | | |
|---|---|---|---|---|
| 4,785,890 A | * | 11/1988 | Martin | A01C 7/006 111/139 |
| 7,861,660 B2 | * | 1/2011 | Martin | A01C 7/006 111/163 |
| 8,550,020 B2 | * | 10/2013 | Sauder | F15B 11/042 701/50 |
| 9,137,939 B2 | * | 9/2015 | Winick | A01B 63/008 |

(Continued)

FOREIGN PATENT DOCUMENTS

| | | | |
|---|---|---|---|
| EP | 3139725 | 6/2018 | |
| EP | 3815492 A1 * | 5/2021 | ............ A01C 5/064 |
| FR | 3092225 | 9/2021 | |

OTHER PUBLICATIONS

"Variable-Depth Planting Controller Coming," Agricultural Review, Feb. 5, 2022 (1page) http://agrireview.com/variable-depth-planting-controller-coming/.

*Primary Examiner* — Alicia Torres
(74) *Attorney, Agent, or Firm* — Dority & Manning, P.A.

(57) ABSTRACT

A seed-planting implement includes a row cleaner assembly having a row cleaner arm pivotably coupled to a row unit frame of the seed-planting implement. The row cleaner assembly also includes a row cleaner wheel rotatably coupled to the row cleaner arm such that the row cleaner wheel is configured to roll relative to a field. Additionally, the implement includes a computing system configured to receive an input indicative of a depth of the furrow being formed within the field and determine a position of the row cleaner wheel relative to a soil surface of the field based on the received input. In addition, the computing system is configured to control an operation of an actuator configured to adjust a position of the row cleaner arm relative to the frame based on the determined position of the row cleaner wheel relative to the soil surface.

15 Claims, 5 Drawing Sheets

(56) References Cited

U.S. PATENT DOCUMENTS

| | | | |
|---|---|---|---|
| 10,080,323 B2 | 9/2018 | Lund et al. | |
| 10,219,421 B2 | 3/2019 | Achen et al. | |
| 10,455,756 B2 | 10/2019 | Sauder et al. | |
| 10,729,053 B2 * | 8/2020 | Martin | A01B 39/22 |
| 10,820,472 B2 | 11/2020 | Stanhope et al. | |
| 10,820,490 B2 * | 11/2020 | Schoeny | A01C 7/205 |
| 11,051,446 B2 | 7/2021 | Antich | |
| 11,140,805 B2 | 10/2021 | Engel et al. | |
| 11,206,754 B2 | 12/2021 | Rhodes | |
| 11,266,060 B2 * | 3/2022 | Schoeny | A01C 14/00 |
| 2019/0297769 A1 * | 10/2019 | Zielke | A01B 63/008 |
| 2020/0375081 A1 * | 12/2020 | Holoubek | A01C 5/064 |
| 2021/0185884 A1 | 6/2021 | Rylander et al. | |
| 2022/0240438 A1 * | 8/2022 | Thompson | A01C 5/064 |
| 2022/0287222 A1 * | 9/2022 | Johnson | A01C 7/203 |

* cited by examiner

SYSTEM AND METHOD FOR CONTROLLING ROW CLEANER POSITIONING ON A SEED-PLANTING IMPLEMENT

FIELD OF THE INVENTION

The present disclosure generally relates to seed-planting implements and, more particularly, to systems and methods for controlling row cleaner positioning on a seed-planting implement.

BACKGROUND OF THE INVENTION

Modern farming practices strive to increase yields of agricultural fields. In this respect, seed-planting implements are towed behind a tractor or other work vehicle to disperse seed throughout a field. For example, many seed-planting implements include several laterally spaced apart row units, with each row unit forming a row of planted seeds within the field. In this respect, each row unit typically includes a furrow opening assembly (e.g., a disk opener(s)) that forms a furrow or trench in the soil. Furthermore, each row unit generally includes a seed-dispensing device (e.g., a seed meter and associated seed tube) that deposits the seeds into the furrow. After deposition of the seeds, a furrow closing assembly (e.g., a pair of closing disks or wheels) may close the furrow in the soil.

In certain configurations, each row unit may include a row cleaner assembly positioned forward of the furrow opening assembly. In general, the row cleaner assembly is configured to break up and sweep away residue, dirt clods, trash, and other debris present within the path of the row unit. The positioning of the row cleaner assembly relative to the frame of the row unit may affect the aggressiveness which the row cleaner sweeps away the debris. As such, systems for controlling the positioning of the row cleaner assembly have been developed. While such systems work well, further improvements are needed.

Accordingly, an improved system and method for controlling row cleaner positioning on a seed-planting implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a seed-planting implement including a toolbar and a plurality of row units supported on the toolbar. Each row unit includes a frame and a disk opener rotatably coupled to the frame, with the disk opener configured to form a furrow within a field across which the seed-planting implement is traveling. Furthermore, each row unit includes a row cleaner assembly positioned forward of the disk opener relative to a direction of travel of the seed-planting implement, with the row cleaner assembly including a row cleaner arm pivotably coupled to the frame and a row cleaner wheel rotatably coupled to the row cleaner arm such that the row cleaner wheel is configured to roll relative to the field. Additionally, each row unit includes an actuator coupled between the frame and the row cleaner arm, with the actuator configured to adjust a position of the row cleaner arm relative to the frame. Moreover, the seed-planting implement includes a computing system configured to receive an input indicative of a depth of the furrow being formed within the field and determine a position of the row cleaner wheel relative to a soil surface of the field based on the received input. In addition, the computing system is configured to control an operation of the actuator based on the determined position of the row cleaner wheel relative to the soil surface.

In another aspect, the present subject matter is directed to a system for controlling row cleaner positioning on a seed-planting implement. The system includes a row unit frame and a disk opener rotatably coupled to the row unit frame, with the disk opener configured to form a furrow within a field across which the seed-planting implement is traveling. Furthermore, the system includes a row cleaner assembly positioned forward of the disk opener relative to a direction of travel of the seed-planting implement, with the row cleaner assembly including a row cleaner arm pivotably coupled to the row unit frame and a row cleaner wheel rotatably coupled to the row cleaner arm such that the row cleaner wheel is configured to roll relative to the field. Additionally, the system includes an actuator coupled between the frame and the row cleaner arm, with the actuator configured to adjust a position of the row cleaner arm relative to the row unit frame. Moreover, the system includes a computing system configured to receive an input indicative of a depth of the furrow being formed within the field and determine a position of the row cleaner wheel relative to a soil surface of the field based on the received input. In addition, the computing system is configured to control an operation of the actuator based on the determined position of the row cleaner wheel relative to the soil surface.

In a further aspect, the present subject matter is directed to a method for controlling row cleaner positioning on a seed-planting implement. The seed-planting implement, in turn, includes a row cleaner assembly having a row cleaner arm pivotably coupled to a row unit frame of the seed-planting implement. Furthermore, the row cleaner assembly includes a row cleaner wheel rotatably coupled to the row cleaner arm. The method includes receiving, with a computing system, an input indicative of a depth of a furrow being formed within a field across which the seed-planting implement is traveling. Additionally, the method includes determining, with the computing system, a position of the row cleaner wheel relative to a soil surface of a field based on the received input. Moreover, the method includes controlling, with the computing system, an operation of an actuator configured to adjust a position of the row cleaner arm relative to the row unit frame based on the determined position of the row cleaner wheel relative to the soil surface.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling row cleaner positioning on a seed-planting implement. As will be described below, the seed-planting implement includes one or more row units, with each row unit configured to plant a row of seeds within a field across which the implement is traveling. In this respect, each row unit includes one or more disk openers rotatably coupled to a row unit frame such that the disk opener(s) is configured to form a furrow within the field. In addition, each row unit may include a closing assembly positioned aft of the disk opener(s) and configured to close the furrow formed within the field after seeds have been deposited therein.

Furthermore, each row unit includes a row cleaner assembly positioned forward of the disk opener. In general, the row cleaner assembly is configured to break up and sweep away residue, dirt clods, trash, and other debris present within the path of the row unit. As such, the row cleaner assembly includes a row cleaner arm pivotably coupled to the row unit frame. Additionally, the row cleaner assembly includes a row cleaner wheel rotatably coupled to the row cleaner arm such that the row cleaner wheel is configured to roll relative to the field, thereby sweeping away debris. Moreover, each row unit may include an actuator (e.g., a pneumatic cylinder) coupled between the row unit frame and the row cleaner arm. As such, the actuator is configured to adjust the position of the row cleaner arm relative to the row unit frame, thereby moving the row cleaner wheel relative to the row unit frame and the soil surface of the field.

In several embodiments, a computing system of the disclosed system is configured to control the operation of the actuator based on the depth of the furrow being formed within the field. More specifically, the computing system is configured to receive an input indicative of the depth of the furrow being formed within the field (e.g., from a user interface, a furrow depth sensor, a stored field map, etc.). Additionally, the computing system may be configured to determine the position of the row cleaner arm relative to the row unit frame based on received position sensor data (e.g., from a rotary sensor coupled between the row unit frame and row cleaner arm). As such, the computing system may determine the position of the row cleaner wheel relative to the soil surface based on the received furrow depth input, the determined position of the row cleaner arm relative to the row unit frame, and one or more geometric characteristics associated with the row cleaner assembly. Thereafter, the computing system may control the operation of the actuator based on the determined position of the row cleaner wheel relative to the soil surface to maintain such position within a target range.

Controlling the position of the row cleaner assembly relative to the frame based on furrow depth improves the operation of the seed-planting implement. More specifically, the positioning of the row cleaner wheel relative to the soil surface affects the aggressiveness with which it sweeps debris away from the path of the corresponding row unit. For example, when the row cleaner wheel is too aggressive, soil may be removed from the path of the row unit, thereby making it difficult to close the furrow. Many conventional systems for controlling row cleaner positioning simply maintain the position of the row cleaner arm relative to the row unit frame within a predetermined range of positions regardless of the position of the row unit frame relative to soil surface. Thus, with such systems, changes in the depth of the furrow being formed may result in changes in the position of the row cleaner wheel relative to the soil surface. However, as described above, the disclosed system and method use furrow depth in addition to the position of the row cleaner arm relative to the row unit frame to maintain the position of the row cleaner wheel relative to the soil surface within a target range. As such, the disclosed system and method maintain the positioning of the row cleaner wheel relative to the soil surface as the furrow depth is adjusted, thereby improving the performance of the seed-planting implement.

Figure 1:
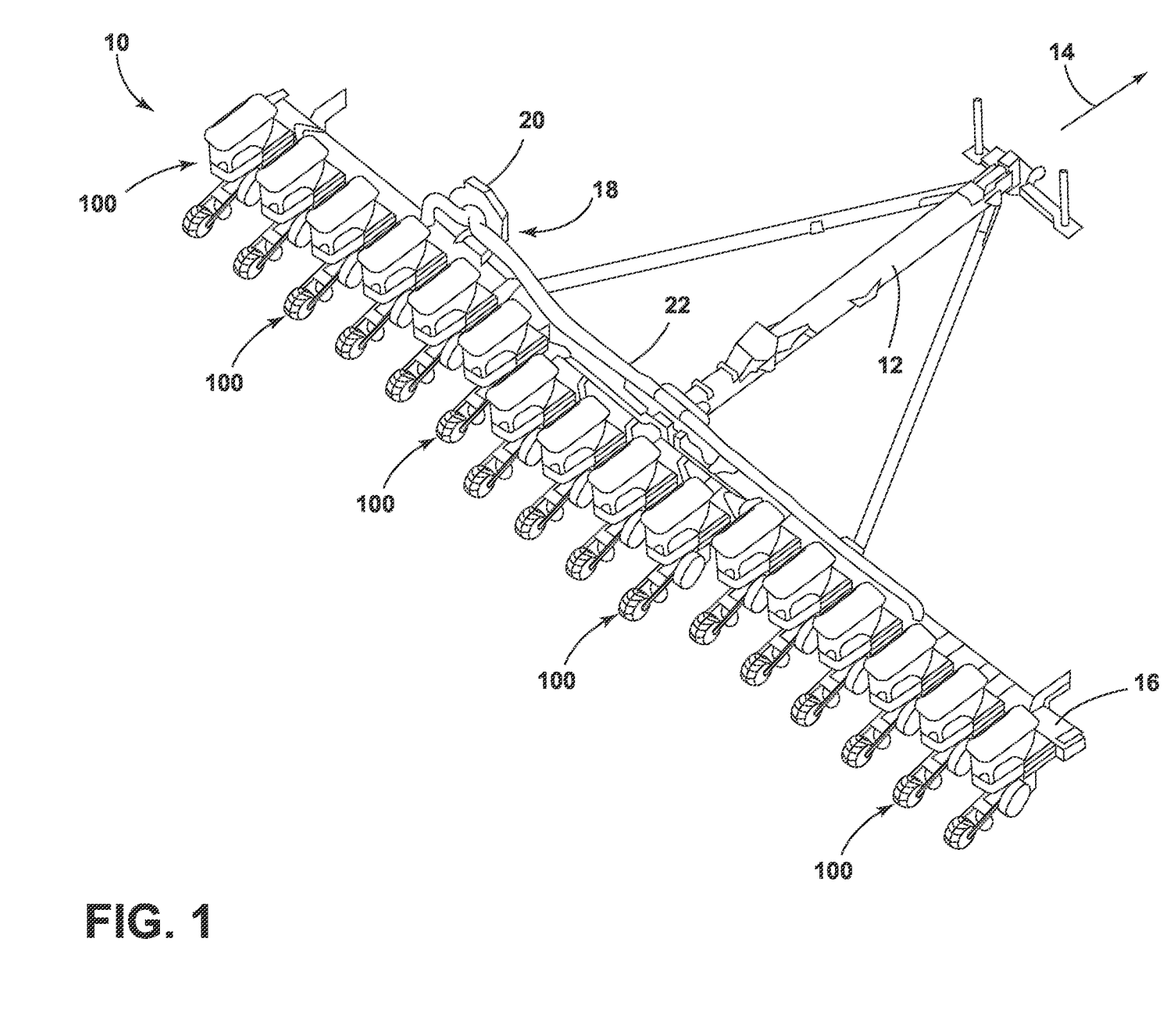
FIG. 1 illustrates a perspective view of one embodiment of a seed-planting implement in accordance with aspects of the present subject matter.

Referring now to the drawings, FIG. 1 illustrates a perspective view of one embodiment of a seed-planting implement 10. In the illustrated embodiment, the seed-planting implement 10 is configured as a planter. However, in alternative embodiments, the seed-planting implement 10 may generally correspond to any suitable seed-planting equipment or implement, such as seeder or another seed-dispensing implement.

As shown in FIG. 1, the seed-planting implement 10 includes a tow bar 12. In general, the tow bar 12 is configured to couple to a tractor or other agricultural vehicle (not shown), such as via a suitable hitch assembly (not shown). In this respect, the tractor may tow the seed-planting implement 10 across a field in a direction of travel (indicated by arrow 14) to perform a seed-planting operation on the field.

Furthermore, the seed-planting implement 10 includes a toolbar 16 coupled to the aft end of the tow bar 12. More specifically, the toolbar 16 is configured to support and/or couple to one or more components of the seed-planting implement 10. For example, the toolbar 16 is configured to support one or more seed-planting units or row units 100. As will be described below, each row unit 100 is configured to form a furrow having a selected depth within the soil of the field. Thereafter, each row unit 100 deposit seeds within the corresponding furrow and subsequently closes the corresponding furrow after the seeds have been deposited, thereby establishing rows of planted seeds.

In general, the seed-planting implement 10 may include any number of row units 100. For example, in the illustrated embodiment, the seed-planting implement 10 includes sixteen row units 100 coupled to the toolbar 16. However, in other embodiments, the seed-planting implement 10 may include six, eight, twelve, twenty-four, thirty-two, or thirty-six row units 100.

Additionally, in some embodiments, the seed-planting implement 10 includes a pneumatic distribution system 18. In general, the pneumatic distribution system 18 is configured to distribute seeds from a bulk storage tank (not shown) to the individual row units 100. As such, the pneumatic distribution system 18 may include a fan or other pressurized air source 20 and a plurality of seed conduits 22 extending between the fan 20 and the row units 100. In this respect, the pressurized air generated by the fan 20 conveys the seeds from the bulk storage tank through the seed conduits 22 to the individual row units 100. However, the seeds may be provided to the row units 100 in any other suitable manner.

Figure 2:
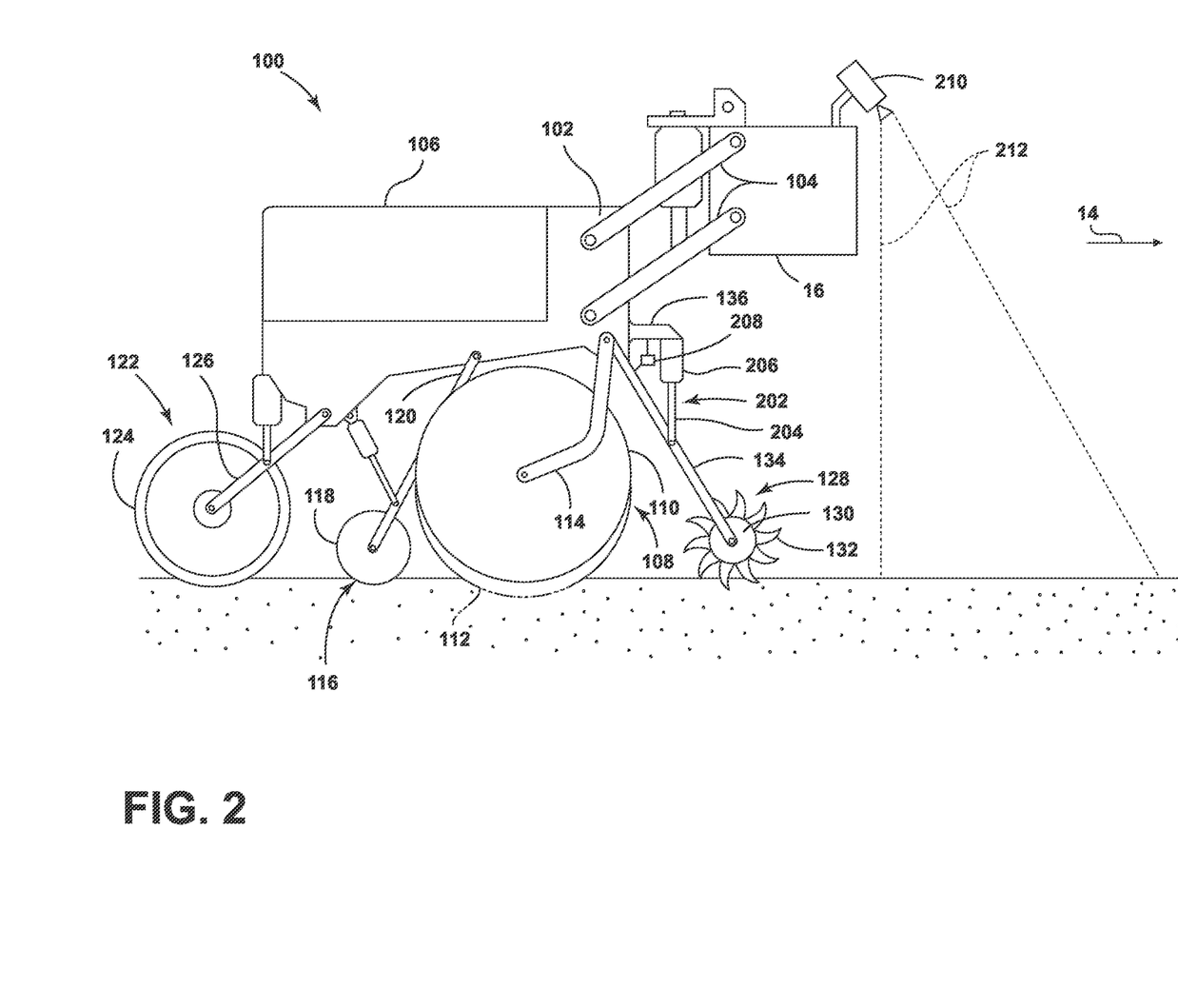
FIG. 2 illustrates a side view of one embodiment of a row unit of a seed-planting implement in accordance with aspects of the present subject matter.

FIG. 2 illustrates a side view of one embodiment of a row unit 100 of the seed-planting implement 10. As shown, the row unit 100 includes a row unit frame 102 adjustably coupled to the toolbar 16 by links 104. For example, one end of each link 104 may be pivotably coupled to the row unit frame 102, while the opposed end of each link 104 may be pivotably coupled to the toolbar 16. However, in alternative embodiments, the row unit 100 may be coupled to the toolbar 16 in any other suitable manner. Furthermore, a hopper 106 may be coupled to or otherwise supported on the row unit frame 102 and configured to store seeds (e.g., that are received from a bulk storage tank via the pneumatic distribution system 18). In addition, a seed-dispensing assembly (not shown) may be supported on the row unit frame 102 and configured to dispense seeds from the hopper 106 into the furrow being formed in the soil.

Moreover, the row unit 100 also includes a furrow opening assembly 108. For example, in one embodiment, the furrow opening assembly 108 may include a gauge wheel 110 and one or more disk openers 112 configured to excavate a furrow or trench in the soil. In general, the gauge wheel 110 is configured to engage the top surface of the soil as the implement 10 is moved across the field. As such, the height of the disk opener(s) 112 may be adjusted with respect to the position of the gauge wheel 110 to set the depth of the furrow being excavated. Furthermore, the furrow opening assembly 108 may include a support arm 114 configured to adjustably couple the gauge wheel 110 to the row unit frame 102. For example, one end of the support arm 114 may be rotatably coupled to the gauge wheel 110, while an opposed end of the support arm 114 may be pivotably coupled to the row unit frame 102. Additionally, the disk opener(s) 112 may be rotatably coupled (e.g., bolted) to the row unit frame 102. However, in alternative embodiments, the gauge wheel 110 and the disk opener(s) 112 may be coupled to the row unit frame 102 in any other suitable manner.

Moreover, the row unit 100 may include a furrow closing assembly 116. Specifically, in several embodiments, the furrow closing assembly 116 may include a pair of closing disks 118 (only one of which is shown) positioned relative to each other to permits soil to flow between the disks 50 as the implement 10 travels across the field. In this regard, the closing disks 118 are configured to close the furrow after seeds have been deposited therein, such as by collapsing the excavated soil into the furrow. Furthermore, the furrow closing assembly 116 may include a support arm 120 configured to adjustably couple the closing disks 118 to the row unit frame 102. For example, one end of the support arm 120 may be rotatably coupled to the closing disks 118, while the opposed end of the support arm 52 may be pivotably coupled to the row unit frame 102. However, in alternative embodiments, the closing disks 118 may be coupled to the row unit frame 102 in any other suitable manner. Furthermore, in alternative embodiments, the furrow closing assembly 116 may include any other suitable components for closing the furrow, such as a pair of closing wheels (not shown).

Additionally, the row unit 100 may include a press wheel assembly 122. Specifically, in several embodiments, the press wheel assembly 122 may include a press wheel 124 configured to roll over the closed furrow to firm the soil over the seed and promote favorable seed-to-soil contact. Furthermore, the press wheel assembly 122 may include a support arm 126 configured to adjustably couple the press wheel 124 to the row unit frame 102. For example, one end of the support arm 126 may be rotatably coupled to the press wheel 124, while the opposed end of the support arm 126 may be pivotably coupled to the row unit frame 102. However, in alternative embodiments, the press wheel 124 may be coupled to the row unit frame 102 in any other suitable manner. Moreover, in some embodiments, the row unit 100 may not include the press wheel assembly 122.

Furthermore, the row unit 100 includes a row cleaner assembly 128 positioned forward of the disk opener(s) 112 relative to the direction of travel 14. In this regard, the row cleaner assembly 128 may be configured to break up and/or sweep away residue, dirt clods, trash, and/or other debris from path of the row unit 100 before the furrow is formed in the soil. For example, in one embodiment, the row cleaner assembly 128 may include one or more row cleaner wheels 130, with each wheel 130 having a plurality of tillage points or fingers 132. As such, the row cleaner wheel(s) 130 may be positioned relative to the soil surface such that the wheel(s) 130 roll relative to the field as the implement 10 travels across the field, thereby allowing the fingers 132 break up and/or sweep away residue, dirt clods, trash, and/or other debris. Additionally, the row cleaner assembly 128 may include a row cleaner arm 134 configured to adjustably couple the row cleaner wheel(s) 130 to the row unit frame 102. For example, one end of the row cleaner arm 134 may be rotatably coupled to the row cleaner wheel(s) 130, while an opposed end of the row cleaner arm 134 may be pivotably coupled to the row unit frame 102.

In several embodiments, an actuator 202 may be configured to move or otherwise adjust the position of the row cleaner assembly 128 relative to the row unit frame 102. For example, as shown, in one embodiment, a first end of the actuator 202 (e.g., a rod 204 of the actuator 202) may be coupled to the row cleaner arm 134 of the row cleaner assembly 128, while a second end of the actuator 202 (e.g., the cylinder 206 of the actuator 202) may be coupled to a row cleaner bracket 136, which is, in turn, coupled to the row unit frame 102. The rod 204 of the actuator 202 may be configured to extend and/or retract relative to the cylinder 206 to adjust the position of the row cleaner assembly 128 relative to the row unit frame 102. Moving the row cleaner assembly 128 relative to the row unit frame 102, in turn, adjusts the position of the row cleaner wheel(s) 130 relative to the soil surface of the field and, thus, the aggressiveness with which the wheel(s) 130 breaks up and sweeps away the debris. In the illustrated embodiment, the actuator 202 corresponds to a pneumatic cylinder. However, in alternative embodiments, the actuator 202 may correspond to any other suitable type of actuator, such as a hydraulic cylinder, an electric linear actuator, and/or the like.

Additionally, the row unit 100 may include a position sensor 208. In general, the position sensor 208 is configured to capture data indicative of the position of the row cleaner arm 134 relative to the row unit frame 102. For example, in the illustrated embodiment, the position sensor 208 is configured as a rotary sensor coupled between the row cleaner arm 134 and the row unit frame 102 (e.g., the row cleaner bracket 136). However, in alternative embodiments, the position sensor 208 may correspond to any other suitable type of sensing device configured to capture data indicative of the position of the row cleaner arm 134 relative to the row unit frame 102.

Moreover, in several embodiments, the seed-planting implement 10 may include a residue sensor 210. In general, the residue sensor 210 is configured to capture data indicative of the residue coverage of a portion of the field positioned forward of the row cleaner assembly 128 relative to the direction of travel 14. For example, in some embodiments, the residue sensor 210 may be configured as a vision-based sensor (e.g., a camera) or a transceiver-based sensor (e.g., a RADAR sensor or a LiDAR sensor) having a field of view or sensor detection zone (e.g., as indicated by dashed lines 212 in FIG. 2) directed towards a section of the field in forward of the row cleaner assembly 128 relative to the direction of travel 14.

In addition, the seed-planting implement 10 may include any suitable number of residue sensors 210. For example, in one embodiment, the seed-planting implement 10 may include only a single residue sensor 210. In another embodiment, the seed-planting implement 10 may include two residue sensors 210, with one residue sensor 210 being mounted on either side of the implement 10. Alternatively, the seed-planting implement 10 may include three or more residue sensors 210, such as one residue sensor 210 for a small group of row units 100 (e.g., for every four row units 100) or one residue sensor 210 for each row unit 100.

The configuration of the seed-planting implement 10 described above and shown in FIGS. 1 and 2 is provided only to place the present subject matter in an exemplary field of use. Thus, the present subject matter may be readily adaptable to any manner of seed-planting implement configuration.

Figure 3:
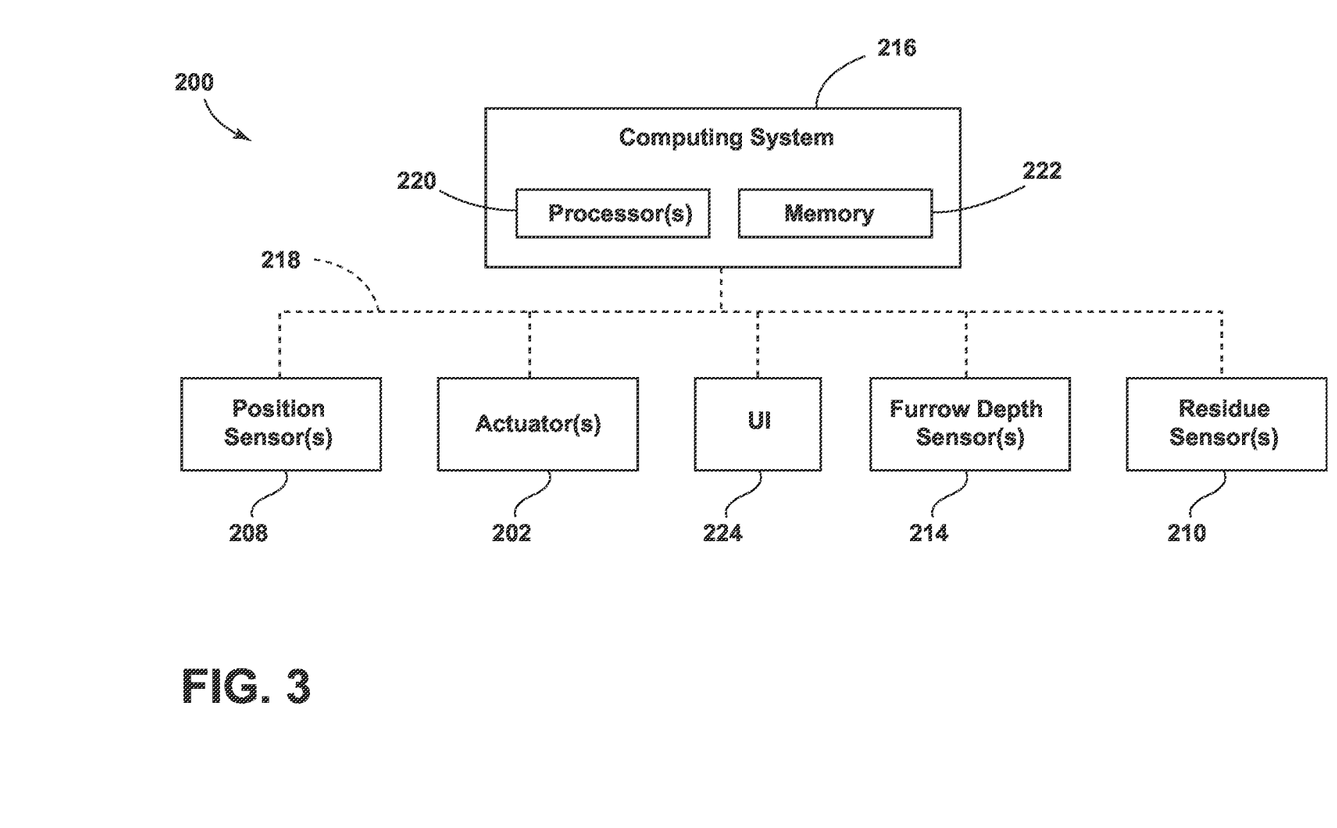
FIG. 3 illustrates a schematic view of one embodiment of a system for controlling row cleaner positioning on a seed-planting implement in accordance with aspects of the present subject matter.

Referring now to FIG. 3, a schematic view of one embodiment of a system 200 for controlling row cleaner positioning on a seed-planting implement is illustrated in accordance with aspects of the present subject matter. In general, the system 200 will be described herein with reference to the seed-planting implement 10 described above with reference to FIGS. 1 and 2. However the disclosed system 200 may generally be utilized with seed-planting implements having any other suitable implement configuration.

As shown, the system 200 may include one or more furrow depth sensor(s) 214. In general, each furrow depth sensor 214 is configured to capture data indicative of the depth of the furrow being formed by the disk opener(s) 112 on one of the row units 100 as the seed-planting implement 10 travels across the field. For example, in some embodiments, the furrow depth sensor 214 is configured as a potentiometer or other rotary sensor configured to capture data indicative of the position (e.g., the angular position) of the corresponding gauge wheel support arm 114 relative to the corresponding row unit frame 102. Such position is, in turn, indicative of the depth of the furrow being formed by the corresponding row unit 100. However, in alternative embodiments, the position sensor 208 may correspond to any other suitable type of sensing device configured to capture data indicative of the depth(s) of the furrow(s) being formed.

Moreover, the system 200 includes a computing system 216 communicatively coupled to one or more components of the seed-planting implement 10 and/or the system 200 to allow the operation of such components to be electronically or automatically controlled by the computing system 216. For instance, the computing system 216 may be communicatively coupled to the sensors 208, 210, 214 via a communicative link 218. As such, the computing system 216 may be configured to receive data from the sensors 208, 210, 214 that is indicative of various parameters associated with the seed-planting implement 10 and/or the field. Furthermore, the computing system 216 may be communicatively coupled to the actuators 202 via the communicative link 218. In this respect, the computing system 216 may be configured to control the operation of the actuators 202 to move row cleaner assembly 128 relative to the row unit frame 102 and the soil surface of the field. In addition, the computing system 216 may be communicatively coupled to any other suitable components of the seed-planting implement 10 and/or the system 200.

In general, the computing system 216 may comprise one or more processor-based devices, such as a given controller or computing device or any suitable combination of controllers or computing devices. Thus, in several embodiments, the computing system 216 may include one or more processor(s) 220 and associated memory device(s) 222 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 222 of the computing system 216 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 222 may generally be configured to store suitable computer-readable instructions that, when implemented by the processor(s) 220, configure the computing system 216 to perform various computer-implemented functions, such as one or more aspects of the methods and algorithms that will be described herein. In addition, the computing system 216 may also include various other suitable components, such as a communications circuit or module, one or more input/output channels, a data/control bus and/or the like.

The various functions of the computing system 216 may be performed by a single processor-based device or may be distributed across any number of processor-based devices, in which instance such devices may be considered to form part of the computing system 216. For instance, the functions of the computing system 216 may be distributed across multiple application-specific controllers or computing devices, such as a tractor/vehicle controller, an implement controller, and/or the like.

Furthermore, the system 200 may also include a user interface 224. More specifically, the user interface 224 may be configured to receive inputs (e.g., inputs associated with the depth of the furrows being formed by the seed-planting implement 10) from the operator. As such, the user interface 224 may include one or more input devices, such as touch-screens, keypads, touchpads, knobs, buttons, sliders, switches, mice, microphones, and/or the like, which are configured to receive inputs from the operator. The user interface 224 may, in turn, be communicatively coupled to the computing system 216 via the communicative link 218 to permit the received inputs to be transmitted from the user interface 224 to the computing system 216. In addition, some embodiments of the user interface 224 may include one or more feedback devices (not shown), such as display screens, speakers, warning lights, and/or the like, which are configured to provide feedback from the computing system 216 to the operator. In one embodiment, the user interface 224 may be mounted or otherwise positioned within the cab of a vehicle configured to tow the seed-planting implement 10 across the field in the direction of travel 14. However, in alternative embodiments, the user interface 224 may mounted at any other suitable location. In some embodiments, the user interface 224 may correspond to a remote device, such as a Smartphone, tablet, laptop, or the like.

Figure 4:
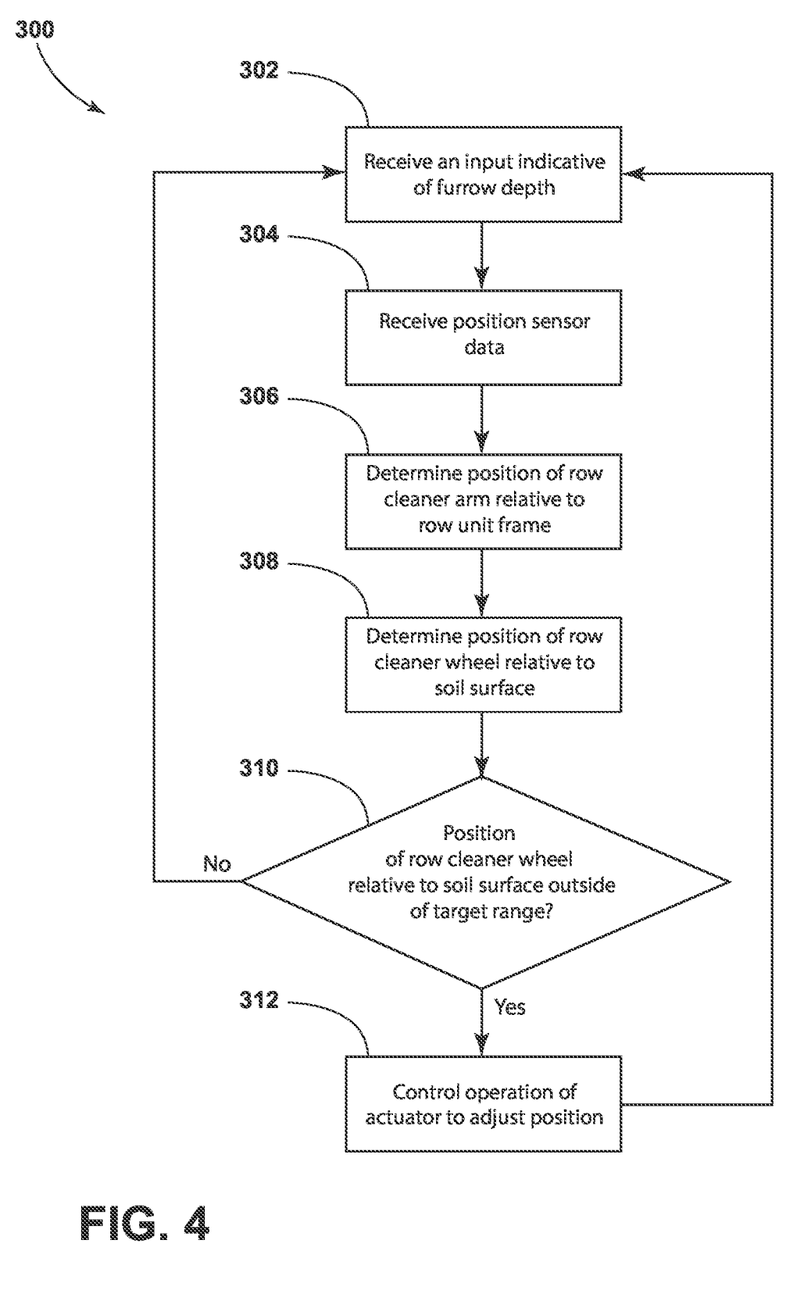
FIG. 4 illustrates a flow diagram providing one embodiment of control logic for controlling row cleaner positioning on a seed-planting implement in accordance with aspects of the present subject matter.

Referring now to FIG. 4, a flow diagram of one embodiment of control logic 300 that may be executed by the computing system 216 (or any other suitable computing system) for controlling row cleaner positioning on a seed-planting implement is illustrated in accordance with aspects of the present subject matter. Specifically, the control logic 300 shown in FIG. 4 is representative of steps of one embodiment of an algorithm that can be executed to control row cleaner positioning on a seed-planting implement to maintain the relative positioning of the row cleaner assembly(ies) and the soil surface as furrow depth changes. Thus, in several embodiments, the control logic 300 may be advantageously utilized in association with a system installed on or forming part of seed-planting implement to allow for real-time control of row cleaner positioning without requiring substantial computing resources and/or processing time. However, in other embodiments, the control logic 300 may be used in association with any other suitable system, application, and/or the like for controlling row cleaner positioning on a seed-planting implement.

As shown in FIG. 4, at (302), the control logic 300 includes receiving an input indicative of the depth of a furrow being formed within a field across which a seed-planting implement is traveling. Specifically, in several embodiments, the computing system 216 may receive one or more inputs indicative of the depth(s) of the furrow(s) being formed within the field across which the seed-planting implement 10 is traveling. As will be described below, the depth(s) of the furrow(s) may be used when controlling the positioning of the row cleaner assembly(ies) 128 of the seed-planting implement 10.

In some embodiments, the computing system 216 may receive the input(s) indicative of the depth(s) of the furrow (s) from the user interface 224. More specifically, as mentioned above, the computing system 216 may be communicatively coupled to the user interface 224 via the communicative link 218. In this respect, the operator may provide an input to the user interface 224, with such input being indicative of the depth of the furrow(s) being formed with the field. Thereafter, the operator input may be transmitted from the user interface 224 to the computing system 216 via the communicative link 218.

Furthermore, in other embodiments, the computing system 216 may receive the input(s) indicative of the depth(s) of the furrow(s) from the furrow depth sensor(s) 214. Specifically, as mentioned above, the computing system 216 may be communicatively coupled to the furrow depth sensor (s) 214 via the communicative link 218. In this respect, as the seed-planting implement 10 travels across the field to perform a seed-planting operation thereon, the computing system 216 may receive data from the furrow depth sensor (s) 214. Such data may, in turn, be indicative of the depth(s) of the furrow(s) being formed by the row unit(s) 100 of the seed-planting implement 10.

Additionally, in further embodiments, the computing system 216 may receive the input(s) indicative of the depth(s) of the furrow(s) from a field map. Specifically, in such embodiments, the computing system 216 may access a field map or a prescription map stored within its memory device (s) 222 or on a remote computing device (e.g., a database server). The field map may, in turn, indicate the furrow depth at various locations within the field. Thus, by geolocating the seed-planting implement 10 within the field (e.g., using GNSS-based data), the computing system 216 can determine the depth(s) of the furrow(s) at its current location within the field using the accessed field map.

Moreover, at (304), the control logic 300 includes receiving position sensor data indicative of the position of a row cleaner arm of the seed-planting implement relative to a row unit frame of the seed-planting implement. Specifically, as mentioned above, in several embodiments, the computing system 216 may be communicatively coupled to the position sensor(s) 208 of the seed-planting implement 10 via the communicative link 218. In this respect, as the seed-planting implement 10 travels across the field to perform the seed-planting operation, the computing system 216 may receive data from the position sensor(s) 208. Such data may, in turn, be indicative of the position(s) of the row cleaner arm(s) 134 relative to the corresponding row unit frame(s) 102.

In addition, at (306), the control logic 300 includes determining the position of the row cleaner arm relative to the row unit frame based on the received position sensor data. Specifically, in several embodiments, the computing system 216 may be configured to determine the position(s) (e.g., the angular position(s)) of the row cleaner arm(s) 134 relative to the row unit frame(s) 102 based on the position sensor data received at (304). For example, the computing system 216 may use a suitable look up table stored within its memory device(s) 222 that correlates the received position sensor data to the position(s) of the row cleaner arm(s) 134.

As shown in FIG. 4, at (308), the control logic 300 includes determining the position of the row cleaner wheel relative to the soil surface of the field based on the received input. Specifically, in several embodiments, the computing system 216 may be configured to determine the position(s) of the row cleaner wheel(s) 130 relative to the soil surface based on the input(s) received at (302), the position(s) of the row cleaner arm(s) 134 relative to the row unit frame(s) 102 determined at (308), and one or more geometric characteristics associated with the row cleaner assembly(ies) 128. Such geometric characteristic(s) may include the length(s) of the row cleaner arm(s) 134, the positioning of the row cleaner bracket(s) 136, and/or the like. Thus, for a given row unit 100, the combination of the depth of the furrow being formed by its disk opener(s) 112, the position of its row cleaner arm 134 relative to its row unit frame 102, and one or more geometric characteristics of its row cleaner assembly 128 allow the computing system 216 to determine the position of its row cleaner wheel 130 relative to the soil surface. In this respect, the computing system 216 may use a suitable look up table stored within its memory device(s) 222 that correlates furrow depth and row cleaner arm position (as the row cleaner assembly geometric characteristic(s) are fixed) to a position of the corresponding row cleaner wheel 130 relative to the soil surface.

Furthermore, at (310), the control logic 300 includes comparing the determined position of the row cleaner wheel relative to the soil surface to a target range. Specifically, in several embodiments, the computing system 216 may compare the position(s) of the row cleaner wheel(s) 130 relative to the soil surface determined at (308) to a target range for such position(s). When the position(s) of the row cleaner wheel(s) 130 relative to the soil surface is within the target range, the row cleaner assembly(ies) 128 is properly functioning, namely the row cleaner assembly(ies) 128 is sufficiently removing debris from the path of the row unit(s) without also removing the soil forming the seedbed. In such instances, the control logic 300 returns to (302). Conversely, when the position(s) of the row cleaner wheel(s) 130 relative to the soil surface falls outside of the target range, the row cleaner assembly(ies) 128 is not properly functioning. For example, the row cleaner assembly(ies) 128 may be sweeping away soil from the seedbed, thereby making it difficult to close the furrow(s). In such instances, the control logic 300 proceeds to (312).

Additionally, at (312), the control logic 300 includes controlling the operation of an actuator configured to adjust the position of the row cleaner arm relative to the row unit frame based on the determined position of the row cleaner wheel relative to the soil surface. Specifically, as mentioned above, in several embodiments, the computing system 216 may be communicatively coupled to the actuator(s) 202 of the seed-planting implement 10 via the communicative link 218. In this respect, when the position(s) of the row cleaner wheel(s) 130 relative to the soil surface falls outside of the target range, the computing system 216 may control the operation of the actuator(s) 202 to adjust the position of the row cleaner arm(s) 134 relative to the row unit frame(s) 102. Such adjustment(s) may, in turn, return the relative positioning of the row cleaner wheel(s) 130 and the soil surface to within the target range. Upon completion of (312), the control logic 300 returns to (302).

Moreover, in some embodiments, the operation of the actuator(s) 202 may be controlled based on the residue coverage of the field in addition to the relative positioning of the row cleaner wheel(s) 130 and the soil surface. For example, when there is high residue coverage within the field, it may be desirable for the row cleaner wheel(s) 130 to engage the soil surface more aggressively to remove the residue from the path of the seed-planting implement 10. Conversely, when there is low residue coverage within the field, it may be desirable for the row cleaner wheel(s) 130 to engage into the soil to less aggressively. More specifically, in such embodiments, the computing system 216 may be communicatively coupled to the residue sensor(s) 210 of the seed-planting implement 10 via the communicative link 218. In this respect, as the seed-planting implement 10 travels across the field to perform the seed-planting operation, the computing system 216 may receive data from the residue sensor(s) 210 that is indicative of the residue coverage of the portion(s) of the field positioned forward of the row cleaner assembly(ies) 128 relative to the direction of travel 14. As such, the computing system 216 may determine the residue coverage(s) of the portion(s) of the field positioned forward of the row cleaner assembly(ies) 128 based on the received residue sensor data. Thereafter, the computing system 216 may control the operation of the actuator(s) 202 based on the residue coverage(s) and the relative positioning of the row cleaner wheel(s) 130 and the soil surface determined at (308).

Figure 5:
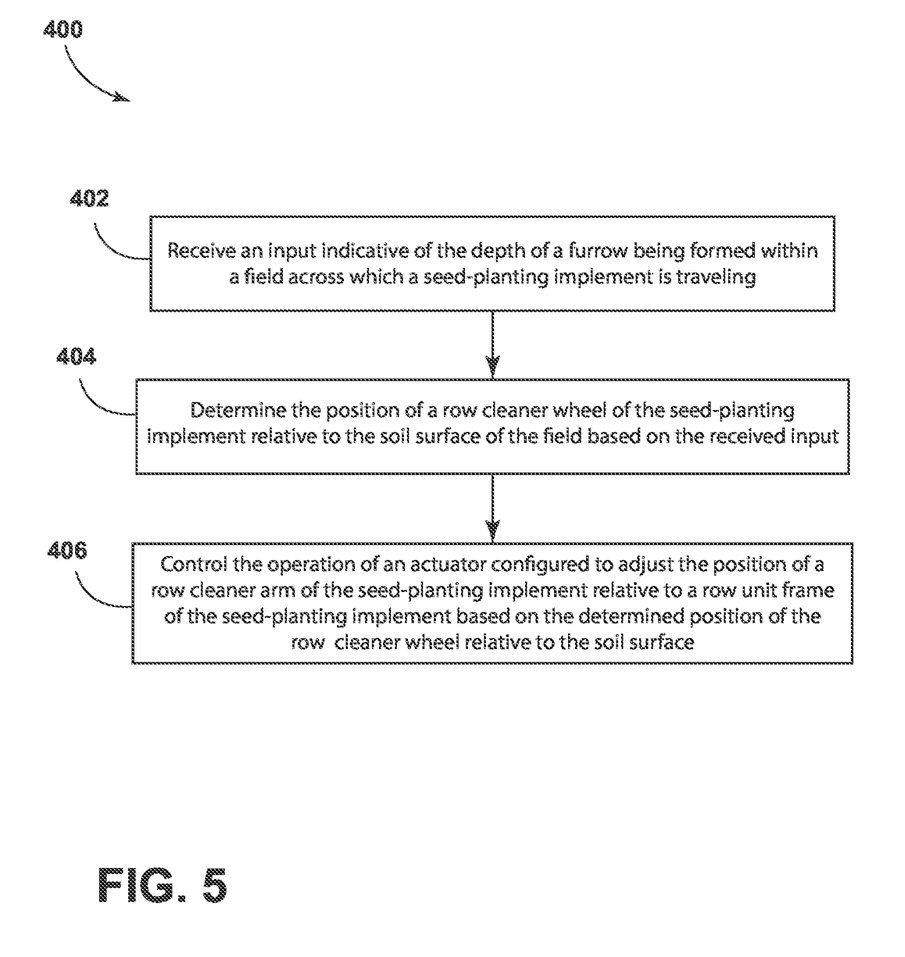
FIG. 5 illustrates a flow diagram of one embodiment of a method for controlling row cleaner positioning on a seed-planting implement in accordance with aspects of the present subject matter.

Referring now to FIG. 5, a flow diagram of one embodiment of a method 400 for controlling row cleaner positioning on a seed-planting implement is illustrated in accordance with aspects of the present subject matter. In general, the method 400 will be described herein with reference to the seed-planting implement 10 and the system 200 described above with reference to FIGS. 1-4. However, the disclosed method 400 may generally be implemented with any seed-planting implement having any suitable implement configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), the method 400 may include receiving, with a computing system, an input indicative of the depth of a furrow being formed within a field across which a seed-planting implement is traveling. For instance, as described above, the computing system 216 is configured to receive an input(s) indicative of the depth(s) of the furrow(s) being formed within a field across which the seed-planting implement 10 is traveling, such as from the user interface 224, the furrow depth sensor(s), and/or a stored field map.

Additionally, at (404), the method 400 may include determining, with the computing system, the position of a row cleaner wheel of the seed-planting implement relative to the soil surface of the field based on the received input. For instance, as described above, the computing system 216 is configured to determine the position(s) of the row cleaner wheel(s) 130 of the seed-planting implement 10 relative to the soil surface of the field based on the received input(s).

Moreover, as shown in FIG. 5, at (406), the method 400 may include controlling, with the computing system, the operation of an actuator configured to adjust the position of a row cleaner arm of the seed-planting implement relative to a row unit frame of the seed-planting implement based on the determined position of the row cleaner wheel relative to the soil surface. For instance, as described above, the computing system 216 may be configured to control the operation of the actuator(s) 202 based on the determined position(s) of the row cleaner wheel(s) 130 relative to the soil surface.

It is to be understood that the steps of the control logic 300 and the method 400 are performed by the computing system 216 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 216 described herein, such as the control logic 300 and the method 400, is implemented in software code or instructions which are tangibly stored on a tangible computer readable medium. The computing system 216 loads the software code or instructions via a direct interface with the computer readable medium or via a wired and/or wireless network. Upon loading and executing such software code or instructions by the computing system 216, the computing system 216 may perform any of the functionality of the computing system 216 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A seed-planting implement, comprising:
   a toolbar;
   a plurality of row units supported on the toolbar, each row unit comprising:
      a frame;
      a disk opener rotatably coupled to the frame, the disk opener configured to form a furrow within a field across which the seed-planting implement is traveling;
      a row cleaner assembly positioned forward of the disk opener relative to a direction of travel of the seed-planting implement, the row cleaner assembly including a row cleaner arm pivotably coupled to the frame and a row cleaner wheel rotatably coupled to the row cleaner arm such that the row cleaner wheel is configured to roll relative to the field; and
      an actuator coupled between the frame and the row cleaner arm, the actuator configured to adjust a position of the row cleaner arm relative to the frame;
      a position sensor configured to capture data indicative of the position of the row cleaner arm relative to the frame; and
   a computing system communicatively coupled to the position sensor, the computing system configured to:
      receive an input indicative of a depth of the furrow being formed within the field;
      determine the position of the row cleaner arm relative to the row unit frame based on the data captured by the position sensor;
      determine a position of the row cleaner wheel relative to a soil surface of the field based on the received input, the determined position of the row cleaner arm relative to the row unit frame, and a geometric characteristic associated with the row cleaner assembly; and
      control an operation of the actuator based on the determined position of the row cleaner wheel relative to the soil surface.

2. The seed-planting implement of claim 1, wherein, when controlling the operation of the actuator, the computing system is configured to:
   compare the determined position of the row cleaner wheel relative to the soil surface to a target range; and
   when the determined position of the row cleaner wheel relative to the soil surface falls outside of the target range, control the operation of the actuator to adjust the position of the row cleaner arm relative to the row unit frame.

3. The seed-planting implement of claim 1, wherein each row unit further comprises:
   a closing assembly positioned aft of the disk opener relative to the direction of travel of the seed-planting implement, the closing assembly configured to close the furrow formed within the field.

4. A system for controlling row cleaner positioning on a seed-planting implement, the system comprising:
   a row unit frame;
   a disk opener rotatably coupled to the row unit frame, the disk opener configured to form a furrow within a field across which the seed-planting implement is traveling;
   a row cleaner assembly positioned forward of the disk opener relative to a direction of travel of the seed-planting implement, the row cleaner assembly including a row cleaner arm pivotably coupled to the row unit frame and a row cleaner wheel rotatably coupled to the row cleaner arm such that the row cleaner wheel is configured to roll relative to the field;
   an actuator coupled between the row unit frame and the row cleaner arm, the actuator configured to adjust a position of the row cleaner arm relative to the row unit frame;
   a position sensor configured to capture data indicative of the position of the row cleaner arm relative to the frame; and
   a computing system communicatively coupled to the position sensor, the computing system configured to:
      receive an input indicative of a depth of the furrow being formed within the field;
      determine the position of the row cleaner arm relative to the row unit frame based on the data captured by the position sensor;
      determine a position of the row cleaner wheel relative to a soil surface of the field based on the received input, the determined position of the row cleaner arm relative to the row unit frame, and a geometric characteristic associated with the row cleaner assembly; and
      control an operation of the actuator based on the determined position of the row cleaner wheel relative to the soil surface.

5. The system of claim 4, wherein the position sensor comprises a rotary sensor coupled between the row unit frame and the row cleaner arm.

6. The system of claim 4, wherein, when controlling the operation of the actuator, the computing system is configured to:
   compare the determined position of the row cleaner wheel relative to the soil surface to a target range; and
   when the determined position of the row cleaner wheel relative to the soil surface falls outside of the target range, control the operation of the actuator to adjust the position of the row cleaner arm relative to the row unit frame.

7. The system of claim 4, wherein, when receiving the input, the computing system is configured to receive the input indicative of the depth of the furrow being formed within the field from a user interface.

8. The system of claim 4, further comprising:
a furrow depth sensor communicatively coupled to the computing system, the furrow depth sensor configured to capture data indicative of the depth of the furrow,
wherein, when receiving the input, the computing system is configured to receive the data captured by the furrow depth sensor.

9. The system of claim 4, wherein, when receiving the input, the computing system is configured to access a stored field map.

10. The system of claim 4, further comprising:
a residue sensor communicatively coupled to the computing system, the residue sensor configured to capture data indicative of a residue coverage of a portion of the field positioned forward of the row cleaner assembly relative to the direction of travel.

11. The system of claim 10, wherein:
the computing system is configured to determine the residue coverage of the portion of the field positioned forward of the row cleaner assembly based on the data captured by the residue sensor, and
when controlling the operation of the actuator, the computing system is configured to control the operation of the actuator based on the determined residue coverage and the determined position of the row cleaner wheel relative to the soil surface.

12. A method for controlling row cleaner positioning on a seed-planting implement, the seed-planting implement including a row cleaner assembly having a row cleaner arm pivotably coupled to a row unit frame of the seed-planting implement, the row cleaner assembly further including a row cleaner wheel rotatably coupled to the row cleaner arm, the method comprising:
receiving, with a computing system, an input indicative of a depth of a furrow being formed within a field across which the seed-planting implement is traveling;
receiving, with the computing system, position sensor data indicative of the position of the row cleaner arm relative to the row unit frame;
determining, with the computing system, the position of the row cleaner arm relative to the row unit frame based on the received position sensor data;
determining, with the computing system, a position of the row cleaner wheel relative to a soil surface of a field based on the received input, the determined position of the row cleaner arm relative to the row unit frame, and a geometric characteristic associated with the row cleaner assembly; and
controlling, with the computing system, an operation of an actuator configured to adjust a position of the row cleaner arm relative to the row unit frame based on the determined position of the row cleaner wheel relative to the soil surface.

13. The method of claim 12, wherein controlling the operation of the actuator comprises:
comparing, with the computing system, the determined position of the row cleaner wheel relative to the soil surface to a target range; and
when the determined position of the row cleaner wheel relative to the soil surface falls outside of the target range, controlling, with the computing system, the operation of the actuator to adjust the position of the row cleaner arm relative to the row unit frame.

14. The method of claim 12, wherein receiving the input comprising receiving, with the computing system, the input indicative of the depth of the furrow being formed within the field from a user interface.

15. The method of claim 12, further comprising:
receiving, with the computing system, residue sensor data indicative of a residue coverage of a portion of the field positioned forward of the row cleaner assembly relative to a direction of travel of the seed-planting implement; and
determining, with the computing system, the residue coverage of the portion of the field positioned forward of the row cleaner assembly based on the received residue sensor data,
wherein controlling the operation of the actuator comprises controlling, with the computing system, the operation of the actuator based on the determined residue coverage and the determined position of the row cleaner wheel relative to the soil surface.

\* \* \* \* \*